United States Patent

Snedeker

[15] 3,673,486
[45] June 27, 1972

[54] BATTERY CHARGING SYSTEM
[72] Inventor: Marion L. Snedeker, Cleveland, Ohio
[73] Assignee: VLN Corporation, Cleveland, Ohio
[22] Filed: Sept. 3, 1970
[21] Appl. No.: 69,234

[52] U.S. Cl. ............................................................. 320/25
[51] Int. Cl. ........................................................... H02j 7/00
[58] Field of Search ........................ 307/127; 320/25; 322/68

[56] References Cited

UNITED STATES PATENTS

| | | | |
|---|---|---|---|
| 3,406,318 | 10/1968 | Harland, Jr. et al. | 320/25 X |
| 3,398,347 | 8/1968 | Citro | 320/25 |

Primary Examiner—William M. Shoop, Jr.
Attorney—Yount and Tarolli

[57] ABSTRACT

A circuit for preventing the buildup of a generating system when it is inadvertently connected in a reverse polarity employs a resistor-diode series combination which is connected between the field winding of a generator that charges the battery and one terminal of the battery. When the battery is connected with a correct polarity, current flows through the field winding of the generator in one direction and no current flows through the diode since the diode is reverse biased. However, when the battery is connected with a reverse polarity, the diode is forward biased and current flows through the diode and its series resistor, and through a parallel combination of field discharge diodes and the field winding. The reverse current in the field will prevent the excitation necessary to build up a voltage output.

10 Claims, 1 Drawing Figure

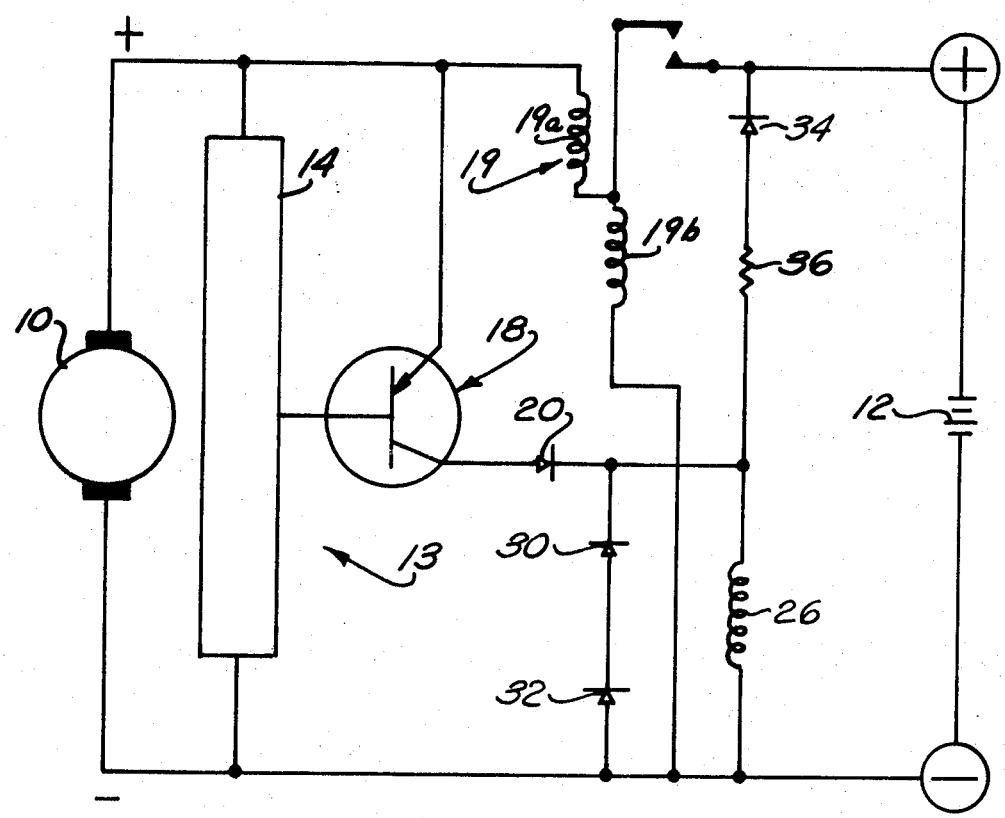

BATTERY CHARGING SYSTEM

Automotive storage batteries may be inadvertently connected with improper polarity so that the battery potential aides the charging potential of the generator. This results in a destructive current flow in the charging system.

An object of the present invention is to provide a means of inhibiting the buildup of the generator field if the polarity connection of the battery is not correct.

Further objects and advantages of the present invention will be apparent from the following detailed description of a specific embodiment of the preferred form of the invention made with reference to the accompanying drawing forming a part of the present specification for all subject matter disclosed therein and in which the sole FIGURE is a schematic representation of an embodiment of the present invention.

Referring to the drawing, a generator armature 10, field 26 is to be connected to charge a battery 12. The output of the generator is regulated by a conventional regulator comprising a voltage sensing circuit 14 and a transistor 18 connected in series in the field circuit of the generating machine. As the output of the generator rises and falls to predetermined limits of regulation, the transistor 18 is switches off and on to maintain a substantially constant output voltage.

The transistor 18 is a PNP transistor and has its emitter connected through a diode 20 to one side of the field winding 26, the other side of the field winding 26 being connected to the negative side of the generator. A pair of field discharge diodes 30, 32 are connected in series across the field winding. Conventionally, only a single field discharge diode is connected across the field winding but a second diode is provided in the illustrated embodiment for purposes to be explained hereinafter.

The generator is connected to the battery when its output reaches a predetermined level by a conventional reverse current cutout relay 19 located in the positive load conductor. The reverse current cutout relay has a current coil 19a in series in the load conductor which connects the positive side of the generating means to the battery and a voltage coil 19b connected between the current coil 19a and the negative side of the generator. When the voltage of the generator reaches a level where the generator is to be connected to the battery, normally a voltage slightly higher than battery voltage, the voltage coil 19b will close the reverse current cutout relay to connect the positive side of the generating machine to the positive terminal of the battery. The current coil 19a will aid in holding in the relay so that the relay does not drop out during normal operation.

If the generator speed drops below that required to produce an E.M.F. slightly higher than the voltage of the battery, a reverse current with flow in winding 19b, causing the contacts of relay 19 to open, thus removing the connection between the battery and the generator.

Since by virtue of the residual magnetism existing within the core of field winding 26, and because the voltage control circuitry is such that the field winding is normally connected in parallel with the armature, the generator will build up to full terminal voltage, and relay 19 will close. Normally if the battery is incorrectly connected, a destructive current will result.

As thus far described, the circuit is a conventional circuit except as heretofore specified and will function in a conventional manner. In accordance with the present invention, the positive side of the field coil 26 is connected to the positive side of the battery through a uni-directional conducting circuit means comprising a current limiting resistor 36 and a diode 34 which is poled to block current flow from the positive load conductor to the field. This diode normally prevents the battery from supplying current to the field through the resistor 36. If the battery is connected with reversed polarity current will flow through field 26, resistor 36 and diode 34. Current will also flow through diodes 32 and 30, resistor 36 and diode 34. Resistor 36 will limit the current through this path as described immediately below.

The voltage across the field 26 will be limited by the combined forward voltage drops across diodes 30 and 32, and will increase only slightly even though the value of current flowing through the diodes is increased many fold. The principal function of resistor 36 is therefore to limit the current flowing through the diode path.

The polarity of the voltage thus produced across the field is such that it opposes the residual magnetism of the field, and the generator will not build up. It should be understood that the magnitude of the voltage can be increased by adding additional diodes to produce the desired voltage value, which must not be so great as to permanently reverse the residual magnetism of the field.

The diode 20 between the transistor and the field winding will prevent the voltage drop across the field winding 26 due to the improper battery polarity from damaging the transistor 18.

From the foregoing, it should be apparent that a new and improved circuit for preventing the flow of destructive current in a generating system when the battery therein is connected in a reverse polarity has been provided. Although the present invention has been described with reference to a particular embodiment, it will be obvious to those skilled in the art that various other modifications such as the use of an alternator rather than a generator may be employed by obvious modifications to those skilled in the art in the scope of the present invention.

What is claimed is:

1. In a generating system, direct current generating means comprising a field winding and including output terminals for said generating means, a field circuit including said winding energized from said generating means, said generating means including means for establishing an initial field on starting for effecting the generation of an initial current and a buildup of the voltage of said generating means to supply normal field current for producing the normal output voltage for the generating means, battery terminal means for connecting a battery with the system with a proper polarity opposing said generating means, switch means responsive to the output of said generating means for connecting the generating means including the field circuit to said battery terminals when the generating means comes up to voltage on starting and for opening the circuit from said battery terminal means to said field circuit and said generating means when said generating means is stopped, and unidirectional conducting circuit means connecting said field winding across said battery terminal means for conducting reverse field current through said field winding when the battery is connected opposite to said proper polarity, said unidirectional conducting means being connected to said battery terminal means intermediate said switching means and said battery terminal means whereby said unidirectional conducting means is effective to conduct a reverse current independently of the condition of said switching means.

2. In a generating system as defined in claim 1 wherein said unidirectional conducting circuit means includes means connected in parallel with said field winding to limit the voltage thereacross.

3. In a generating system as defined in claim 2 wherein said field means has residual magnetism for supplying the initial exciting field for said field winding and said voltage limiting means limits the current in the field winding to a magnitude to overcome voltage buildup in the generating means because of the residual magnetism but insufficient to reverse the magnetism of the polarity of said residual magnetism.

4. In a generating system as defined in claim 1 wherein said field circuit includes regulating means in series with said winding for regulating current in said field winding and said unidirectional conducting circuit means is connected in parallel with said switching means and said regulating means.

5. In a generating system as defined in claim 4 wherein said unidirectional conducting circuit means includes means connected in parallel with said field winding to limit the voltage thereacross.

6. In a generating system as defined in claim 5 wherein said unidirectional conducting circuit means includes a current limiting resistor in series with said field winding to limit the current therethrough.

7. In a generating system as defined in claim 5 wherein said field means has residual magnetism for supplying the initial exciting field for said field winding and said voltage limiting means limits the current in the field winding to a magnitude to overcome voltage buildup in the generating means because of the residual magnetism but insufficient to reverse the polarity of the residual magnetism of the field means.

8. In a generating system as defined in claim 4 wherein said regulating means comprises a transistor having collector and emitter electrodes connected in series with said field winding and said field circuit comprises a diode means in series with said electrodes for preventing reverse current flow in said field from flowing through the collector-emitter electrodes of said transistor.

9. In a direct current generating system, direct current generating means having output terminal means and field means comprising a field circuit energizable from said generating means and including regulating means and a field winding connected in series, said regulating means comprising a transistor having collector-emitter electrodes connected in series with the field winding, battery terminal means for connecting a battery into said system with its polarity opposing said generating means, switch means for connecting said battery terminal means across said field circuit and said output terminals, unidirectional current conducting means connected in parallel with said collector-emitter electrodes and connecting said field winding across said battery terminal means to conduct current in a reverse direction in said field winding when a battery is connected with a polarity to cause current flow in said generating means in the same direction that normally flows therein during current generation to oppose the normal field established by said winding, said field circuit including unidirectional conducting means for preventing the current from flowing through said transistor in response to an improperly connected voltage.

10. In a direct current generating means as defined in claim 9 wherein said regulating means comprises a transistor having collector and emitter electrodes connected in series with said field winding.

* * * * *